Dec. 7, 1971  S. G. LIDDLE ET AL  3,625,003
SPLIT COMPRESSOR GAS TURBINE
Filed Sept. 8, 1970
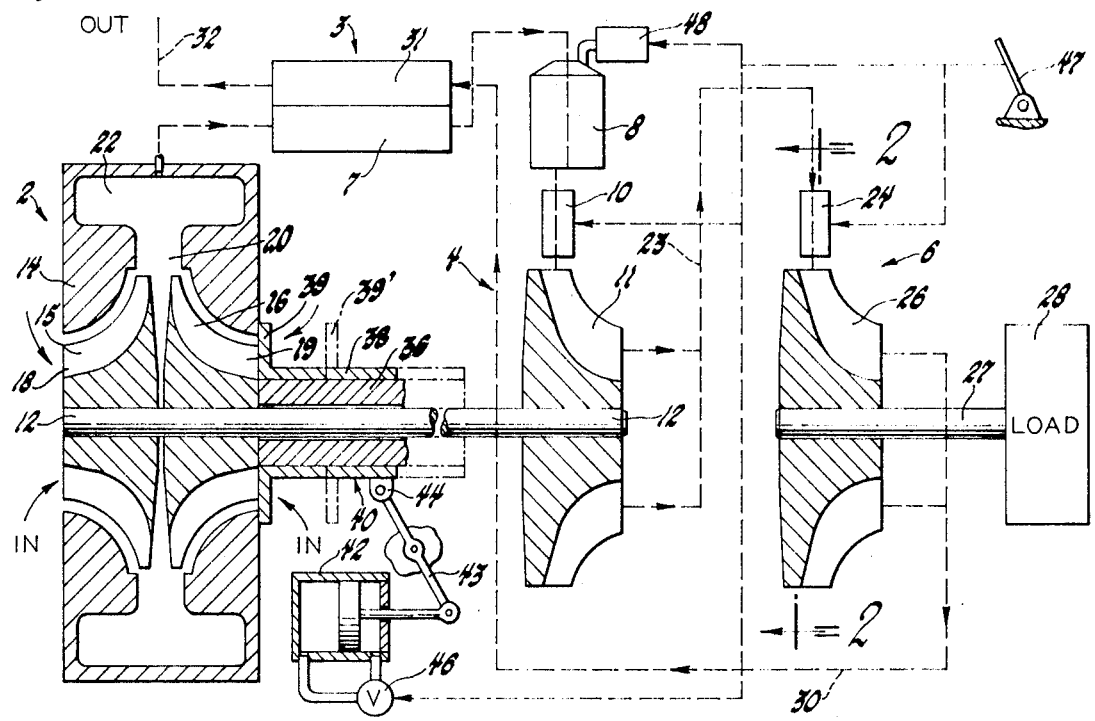
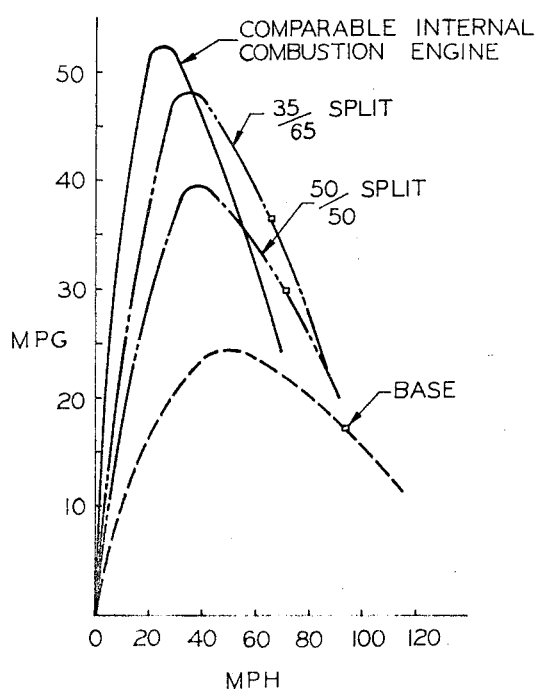
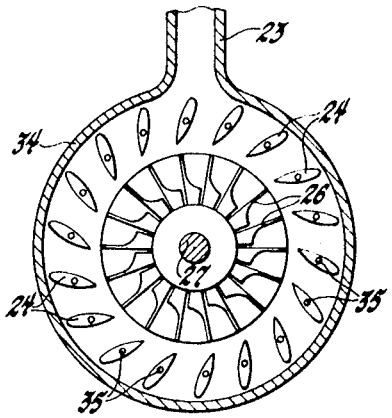
INVENTORS
Sidney G. Liddle &
Mason K. Yu
BY
Paul Fitzpatrick
ATTORNEY United States Patent Office 3,625,003
Patented Dec. 7, 1971

3,625,003
SPLIT COMPRESSOR GAS TURBINE
Sidney G. Liddle, Troy, and Mason K. Yu, Birmingham, Mich., assignors to General Motors Corporation, Detroit, Mich.
Filed Sept. 8, 1970, Ser. No. 70,201
Int. Cl. F02c 9/14; F02g 3/00
U.S. Cl. 60—39.25                                        9 Claims

ABSTRACT OF THE DISCLOSURE

A gas turbine engine has a double-entry centrifugal compressor, combustion apparatus supplied by the compressor, and a turbine having variable nozzle area supplied from the combustion apparatus and driving the compressor. The turbine may drive the load or a second power turbine in series with the compressor driving turbine may be provided. A regenerator to exchange heat between turbine exhaust and compressed air is preferably provided. One side of the double-entry compressor is provided with a shut off valve which closes the entrance to this side for operation at idling and under light loads. The valve is opened completely for higher power output of the engine.

---

Our invention relates to gas turbine engines and especially to an engine particularly suited to the requirements for propulsion of an automobile or the like.

While the typical gas turbine engine offers many advantages over the reciprocating engine as the prime mover for automobiles, it has significant drawbacks, perhaps the greatest of which is high fuel consumption at idling and under light and medium loads. While the exhaust of the gas turbine engine is relatively clean, any unnecessary fuel consumption tends to increase the total discharge of undersired exhaust constituents from the engine. Also, even though the engine is suited to low cost fuels, excess fuel consumption is economically wasteful. This is particularly true in the usual operation of a light automotive vehicle, as contrasted to heavy trucks and buses used in highway service. In a typical urban automobile operation, the engine is idle a great part of the time, and in typical highway driving the engine, while not idle, is operated far below full capacity because the power plant, to be acceptable for automotive use, must have considerable reserve power for acceleration. Thus, in crusing at normal freeway speeds, an engine adequate for acceleration of the vehicle may well be operating at about thirty percent of its full power output. It is also clear that an engine to be acceptable for the usual passenger automobile must be reasonably simple and inexpensive.

We have conceived of an improvement in the usual automotive gas turbine which may be more specifically defined as being an engine with a compressor, combustion apparatus, and a turbine driving the compressor, with a second turbine to provide the power output shaft. Many such engines have been proposed, some of them with variable turbine nozzles to accommodate the varying loads. Usually, for fuel economy, such designs have included a regenerator also. Examples of automotive gas turbine engines are described in Conklin et al. U.S. Pat. No. 2,972,-230, Feb. 21, 1961; Amann et al. U.S. Pat. No. 3,116,605, Jan. 7, 1964, Flanigan et al. U.S. Pat. No. 3,237,404, Mar. 1, 1966; and Collman et al. U.S. Pat. No. 3,267,674, Aug. 23, 1966.

In its preferred embodiment, our invention involves modifying the conventional automotive gas turbine by providing it with a double-sided centrifugal compressor or an equivalent arrangement of two parallel compressors, with means operable to completely close or completely open the inlet to one side of the compressor or one compressor. This makes it possible to operate the compressor installation as a smaller capacity compressor with one side shut off and, in accordance with this, the turbine nozzle is reduced in area to be compatible with the reduced air flow.

The result is that the engine is capable of operating efficiently as, in effect, a smaller engine having a reduced maximum power output and a reduced fuel consumption and exhaust discharge. Thus, the engine is operated as a one-sided compressor engine at idle and at part load, but the other side of the compressor may be opened and the turbine nozzle vanes opened for greater power output up to the maximum power output of the engine for acceleration.

We are aware that there have been proposals to vary the configuration of gas turbine engines of one sort or another to reduce air flow for operation at low power, specifically the following: Weir U.S. Pat. No. 2,582,809, Jan. 15, 1952 discloses a pet engine with two centrifugal compressors back to back, each supplying a group of combustion chambers and each group of combustion chambers supplying one of two cascades of blades on the turbine which drives the compressors. A valve arrangement is provided to close or substantially close the inlet to one of the compressors. Rennie et al. U.S. Pat. No. 2,662,371, Dec. 15, 1953, discloses a turbojet engine with a compressor having an arrangement for varying the flow area through the compressor and with a number of combustors with valves to close off flow through some of the combustors as the compressor flow area is reduced. Mock U.S. Pat. No. 3,124,931, Mar. 17, 1964, discloses a shaft-powered gas turbine proposed for automotive use including a variable diffuser at the compressor outlet and a sliding throttle plate or other means for varying the turbine flow area.

As will be seen from the following detailed description, our invention involves a different approach from those referred to above, making for a simple, feasible, and efficient variable capacity gas turbine engine.

The principal objects of our invention are to provide a gas turbine engine having improved fuel economy at idle and low power output; to provide a feasible split compressor gas turbine engine in which one-half of the split compressor may be closed or opened to provide a gas turbine engine particularly suited for automotive purposes; to provide a gas turbine engine minimizing discharge of combustion products at low power output of the engine; and to provide a power plant operating at relatively high economy both at low and high power output and having characteristics suiting it for application to a passenger automobile.

The nature of our invention and its advantages will be clear to those skilled in the art from the succeeding detailed description of the preferred embodiment of the invention.

FIG. 1 is a schematic illustration of a dual shaft regenerative gas turbine engine.

FIG. 2 is a schematic illustration of a variable nozzle turbine.

FIG. 3 is a set of curves setting out the advantages of configurations according to our invention.

The gas turbine engine illustrated in FIG. 1 includes a double-entry centrifugal compressor 2, a regenerator or recuperator 3, a high pressure turbine 4, and a low pressure turbine 6. Air flows from the compressor through the compressed air pass 7 of the regenerator, where it is heated, and then flows through combustion apparatus 8 where it is further heated by combustion of fuel. The combustion products flow through a variable area nozzle 10 into the rotor 11 of the centripetal high pressure turbine rotor 11. This rotor drives a shaft 12 which drives the rotors of the compressor 2.

The centrifugal compressor 2 includes a case or stator 14 defining a space in which back to back rotors 15 and 16 of the centrifugal compressing apparatus are disposed. Air enters the rotor 15 through an inlet 18 and enters the rotor 16 through an inlet 19. Air is discharged from the rotors into an annular diffuser 20, which may be vaned or vaneless as desired, and is discharged into a plenum 22 from which it flows to the regenerator. It will be understood that the compressor and turbine ordinarily are mounted in a common case as with the vehicle turbines referred to above, but this is immaterial to the present invention. Compressor 2, combustion apparatus 3, and turbine 4 constitute a gas generator which discharges hot gas under pressure from the outlet of turbine 4 through a line indicated schematically at 23 to the variable area nozzle 24 and centripetal rotor 26 of the low pressure turbine 6. It will be understood that either or both of the turbines may be other than centripetal, but this is the preferred type. Turbine 6 drives a power output shaft 27 which is connected to any load 28 which may, for example, be the transmission, differential, and driving wheels of a motor vehicle. The exhaust from the low pressure turbine 6 flows through exhaust line 30 to the second pass 31 of the regenerator 3 and to an exhaust outlet indicated at 32.

The regenerator is a desirable component of this system to reduce fuel consumption and improve the efficiency of the engine. However, an operative engine employing the principles of the invention may omit the regenerator. The regenerator may be of the rotary type such as those described in the Amann et al. and Collman et al. patents referred to above, or may be a fixed heat exchanger.

Also, the engine may be of a single shaft type, with a single turbine driving shafts 12 and 27, or a controllable coupling as described in Flanigan et al., supra, may be provided between the turbines.

It should be understood that the engine structure as so far described may be considered to be conventional except that it is not customary to employ double-entry compressors in engines of this type. It may also be pointed out that the clearances between the rotor and stator of the compressor are exaggerated in the schematic; in a practical engine these clearances are minimized.

FIG. 2 illustrates in somewhat less schematic fashion FIG. 1 one type of structure of a variable area centripetal turbine, the view being a transverse sectional view on a plane generally as indicated by the line 2—2 in FIG. 1.

In FIG. 2, the turbine inlet line 23 enters a turbine case or scroll 34 within which is mounted the ring of turbine inlet guide vanes 24 ecah vane being rotatable about an axis 35 parallel to the axis of rotation of the turbine. The vanes discharge the gas into a conventional centripetal turbine rotor 26 from which it flows to the exhaust. By rotating the vanes concurrently about their axes 35, the area of the nozzle is varied. A centripetal turbine of this general nature is shown more structurally in Houghton U.S. Pat. No. 2,985,426, May 23, 1961. Other arrangements for varying the area of a turbine nozzle which might be employed are exemplified by White U.S. Pat. No. 2,739,782, Mar. 27, 1956, and Buchi U.S. Pat. No. 2,861,774, Nov. 25, 1958. It will be understood that the turbine 4 may be similar in structure to turbine 6. If either turbine is axial-flow, the turbine nozle area may also be varied by known expedients.

The arrangement for opening and closing the inlet to one compressor rotor may have various mechanical embodiments but, for best operating characteristics of the engine, it must be such as to operate at either two conditions; one, with the compressor inlet open and unobstructed without any throttling, and the other with the compressor inlet closed by a closure device as close as mechanically feasible to the rotor so as to minimize windmilling losses which would detract from the overall efficiency of the engine with the inlet closed.

A suitable structure for this purpose is illustrated in FIG. 1. A shaft housing 36, fixed in some way to the compressor case, has a cylindrical outer surface on which is reciprocally mounted a sleeve 38 having a flange 39 at one end, the sleeve 38 and flange 39 constituting a movable valve member 40. The flange 39 is shown abutting the rear face of the compressor case 14 and in close proximity to the rotor 16, blocking the inlet 19. The valve member may be shifted axially so that the flange 39 is moved to a position as indicated by 39′ in broken lines in FIG. 1. This is effected, as shown by a piston and cylinder actuator 42 the movable part of which is connected by a lever 43 to a lug 44 on the sleeve 38. Any suitable mechanical arrangement may be employed for the purpose. The actuator 42 may be operated to hold the valve member 40 in the position shown or to move it to the other limit of its movement as indicated at 39′.

This actuation may be accomplished by suitable valve means controlling a source of fluid under pressure so that the actuator is energized to move to one or the other position concurrently with opening and closing of the turbine nozzle vanes 10 and 24. These vanes may be operated by a similar actuator and the actuator preferably is controlled by means responsive to the power demand imposed upon the engine. The most convenient way of effecting such control is by a valve responsive to the position of the accelerator pedal 47 or other power controlling device by which the engine output is controlled. This pedal is illustrated schematically as connected to a fuel control 48, valve 46, and variable nozzles 10 and 24.

FIG. 3 is a diagram illustrating the advantages of the invention as applied to a gas turbine for a small passenger vehicle as compared with an internal combustion engine and to a turbine without the variable feature described above. Curves are of fuel consumption in miles per gallon as a function of miles per hour. The uppermost curve entitled "Comparable Internal Combustion Engine" shows fuel consumption for a reciprocating gasoline engine; the curve entitled "Base" shows the fuel consumption for a constant geometry gas turbine engine. To explain the word "Comparable," this means that the gasoline engine is capable of giving performance comparable in terms of acceleration and general driving ability to the base turbine. The reciprocating engine, for equivalent acceleration, may be of considerably lower maximum power than the turbine, which is one reason for the markedly lower fuel consumption of the internal combustion engine. The curve entitled "50/50 Split" illustrates the improvement with respect to the base engine in miles per gallon and it will be seen that the mileage is improved by a factor of about fifty percent over a very considerable speed range. It is also improved at idle, but this is not shown in the diagram. With the 50/50 split, which means that the two compressors, or the two sides of the compressor, are of equal capacity, closing the valve 40 shuts off half of the compressor capacity of the engine. In this condition it is figured that the engine still has enough power for normal operation apart from fast acceleration and to drive the light motor vehicle up to approximately ninety miles per hour.

The curve entitled "35/65 Split" illustrates a further gain in fuel economy so that the compressor which is closed off for low speed operation normally flows sixty-five percent of the air as against thirty-five percent for the compressor which operates continuously. In this case, the fuel economy is still further drastically improved, although the total power available becomes less and the top speed available without cutting in the second compressor becomes less. Obviously, the particular division of capacity can be arranged as the best compromise for a particular installation.

The power level at which the valve 40 is opened will be, of course, determined by the compressor split and by the characteristics of the engine, vehicle, and transmission so that the low fuel consumption of the partly blocked engine is maintained to a point at which it is no longer satisfactory, at which time the full compressor and full turbine area are used.

Incidentally, the acceleration away from a standing condition can be improved by increasing the idle speed of the gas generator. With the compressor partly blocked, the higher idle speed can be maintained without as much sacrifice of fuel economy as with the full compressor.

The advantages of the invention will be apparent from the foregoing. The detailed description of the preferred embodiment of the invention for the purpose of explaining the principles thereof is not to be considered as limiting or restricting the invention, since many modifications can be made by the exercise of skill in the art.

We claim:

1. A gas turbine engine comprising, in combination, two parallel-connected compressors each having an inlet and a rotor, a turbine constantly coupled to the compressor rotors to drive the compressors, combustion apparatus connected for flow of compressed air from the compressors and flow of combustion products to the turbine, closure means effective when operated to close the inlet to one compressor closely adjacent to the rotor so as to minimize windmilling losses in the said compressor and effective when not operated to open fully the said inlet to avoid throttling of the compressor, and variable nozzle means effective to reduce the entrance area of the turbine concurrently with operation of the closure means.

2. An engine as recited in claim 1 in which the compressors are defined by a double-entry centrifugal compressor.

3. An engine as recited in claim 1 in which the compressors are of unequal capacity.

4. An engine as recited in claim 1 in which the compressors are of substantially equal capacity.

5. An engine as recited in claim 1 in which the compressors and rotors are defined by a double-entry centrifugal compressor and the two sides of a rotor thereof and both rotors discharge into a common diffuser.

6. An engine as recited in claim 1 including also a regenerator to transfer heat from the engine exhaust to air flowing to the combustion apparatus.

7. A gas turbine engine comprising, in combination, two parallel-connected compressors each having an inlet and a rotor, a turbine constantly coupled to the compressor rotors to drive the compressors, combustion apparatus connected for flow of compressed air from the compressors and flow of combustion products to the turbine, closure means effective when operated to close the inlet to one compressor closely adjacent to the rotor so as to minimize windmilling losses in the said compressor and effective when not operated to open fully the said inlet to avoid throttling of the compressor, variable nozzle means effective to reduce the entrance area of the turbine concurrently with operation of the closure means, and control means operable to control engine power level coupled to the closure means and variable nozzle means so as to operate the closure means and variable nozzle means below a given engine power level.

8. An engine as recited in claim 7 including also a second turbine energized by the combustion products and coupled to the load.

9. A gas turbine engine comprising, in combination, a double-entry centrifugal compressor having two inlets and a rotor, a turbine constantly coupled to the compressor rotor to drive the compressor, combustion apparatus connected for flow of compressed air from the compressor and flow of cumbustion products to the turbine, closure means effective when operated to close one inlet to the compressor closely adjacent to the rotor so as to minimize windmilling losses in the said compressor and effective when not operated to open fully the said inlet to avoid throttling of the compressor, two-position variable nozzle means effective to reduce the entrance area of the turbine concurrently with operation of the closure means, and control means operable to control engine power level coupled to the closure means and variable nozzle means so as to operate the closure means and variable nozzle means below a given engine power level.

References Cited
UNITED STATES PATENTS

| | | | |
|---|---|---|---|
| 2,582,809 | 1/1952 | Weir | 60—26.3 |
| 2,811,833 | 11/1957 | Broffitt | 60—39.31 |
| 2,821,067 | 1/1958 | Hill | 60—39.16 X |
| 3,080,713 | 3/1963 | Silver | 60—39.29 |
| 3,357,178 | 12/1967 | Meyers | 60—39.25 |

CLARENCE R. GORDON, Primary Examiner

U.S. Cl. X.R.

60—39.29, 39.16